United States Patent
Nguyen et al.

(10) Patent No.: US 10,448,364 B2
(45) Date of Patent: Oct. 15, 2019

(54) METHODS AND APPARATUS RELATED TO TIME TRACKING IN MULTI CARRIER SYSTEMS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Dover, DE (US); Shailesh Patil, Raritan, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/710,460

(22) Filed: Sep. 20, 2017

(65) Prior Publication Data
US 2018/0206208 A1    Jul. 19, 2018

Related U.S. Application Data

(60) Provisional application No. 62/448,374, filed on Jan. 19, 2017.

(51) Int. Cl.
*H04W 72/00* (2009.01)
*H04W 56/00* (2009.01)
(Continued)

(52) U.S. Cl.
CPC ....... *H04W 72/005* (2013.01); *H04W 56/001* (2013.01); *H04W 72/0446* (2013.01); *H04W 48/10* (2013.01); *H04W 72/048* (2013.01)

(58) Field of Classification Search
CPC ............ H04W 72/005; H04W 56/001; H04W 72/0446; H04W 48/10; H04W 72/048
See application file for complete search history.

(56) References Cited

U.S. PATENT DOCUMENTS

2010/0238857 A1   9/2010   Zhang et al.
2013/0279433 A1*  10/2013  Dinan ............... H04W 52/146
                                                370/329
(Continued)

FOREIGN PATENT DOCUMENTS

EP         3125633 A1     2/2017
WO      2011087408 A1     7/2011
(Continued)

OTHER PUBLICATIONS

International Search Report and Written Opinion—PCT/US2017/067650—ISA/EPO—dated Mar. 27, 2018.

*Primary Examiner* — Ian N Moore
*Assistant Examiner* — Latresa A McCallum
(74) *Attorney, Agent, or Firm* — Arent Fox LLP

(57) ABSTRACT

In an aspect, an apparatus, e.g., a base station of a first network, maybe configured to receive UE capability information from each UE of a plurality of UEs, the UE capability information indicating a number of different carrier synchronization timings that the UE can track within a plurality of carriers. The carriers maybe associated with multiple different networks including the first network. The apparatus maybe configured to determine, based on the received UE capability information, a set of synchronization-timing priorities indicating a priority for timing synchronization types for use within each carrier of a set of carriers of the plurality of carriers, and broadcast the set to the UEs. In an aspect, a UE may determine and send the UE capability to a base station. The UE may receive the set of synchronization-timing priorities and perform timing synchronization based on the received set of synchronization-timing priorities.

30 Claims, 10 Drawing Sheets

(51) Int. Cl.
*H04W 72/04* (2009.01)
*H04W 48/10* (2009.01)

(56) References Cited

U.S. PATENT DOCUMENTS

| | | | |
|---|---|---|---|
| 2014/0162642 A1* | 6/2014 | Kwon | H04W 8/24 455/435.1 |
| 2015/0256249 A1* | 9/2015 | Doetsch | H04L 5/0007 370/329 |
| 2016/0174179 A1 | 6/2016 | Seo et al. | |
| 2018/0132254 A1* | 5/2018 | Chae | H04W 72/02 |

FOREIGN PATENT DOCUMENTS

| | | |
|---|---|---|
| WO | 2013169061 A1 | 11/2013 |
| WO | 2015147608 A1 | 10/2015 |
| WO | 2016099888 A1 | 6/2016 |

\* cited by examiner

METHODS AND APPARATUS RELATED TO TIME TRACKING IN MULTI CARRIER SYSTEMS

CROSS-REFERENCE TO RELATED APPLICATION(S)

This application claims the benefit of U.S. Provisional Application Ser. No. 62/448,374, entitled METHODS AND APPARATUS RELATED TO TIME TRACKING IN MULTI CARRIER SYSTEMS filed on Jan. 19, 2017, which is expressly incorporated by reference herein in its entirety.

BACKGROUND

Field

The present disclosure relates generally to communication systems, and more particularly, to methods and apparatus that facilitate prioritized time tracking by devices that support multi-carrier operations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In systems where devices support multiple carrier components (MCC) and where such multiple carrier components have different reference timings, device implementation may be challenging because the devices may need to keep track of the different possible synchronization timings corresponding to the different supported carrier components. Furthermore, the challenge may scale quickly with the number of carrier components.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus, e.g., a base station associated with a first network, may be configured to receive user equipment (UE) capability information from each UE of a plurality of UEs, the UE capability information indicating at least a number of different carrier synchronization timings that the UE can track within a plurality of carriers. The plurality of carriers may be associated with a plurality of different networks including the first network. The apparatus may be further configured to determine a set of synchronization-timing priorities based on the received UE capability information, where the set of synchronization-timing priorities indicates a priority for timing synchronization types for use within each carrier of a set of carriers of the plurality of carriers. The apparatus may be further configured to broadcast the determined carrier timing-synchronization priority to the plurality of UEs.

In another aspect of the disclosure, a method, a computer-readable medium, and an apparatus are provided. The apparatus, e.g., a UE, may be configured to determine a UE capability of the UE associated with at least a number of different carrier synchronization timings that the UE can track within a plurality of carriers, and send the determined UE capability to a base station. The plurality of carriers may be associated with a plurality of different networks including the first network. In some configurations the apparatus may be further configured to receive from the base station, a set of synchronization-timing priorities for prioritizing timing synchronization types within each carrier of a set of carriers of the plurality of carriers, and synchronize, for at least one carrier, a timing based on the received set of synchronization-timing priorities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
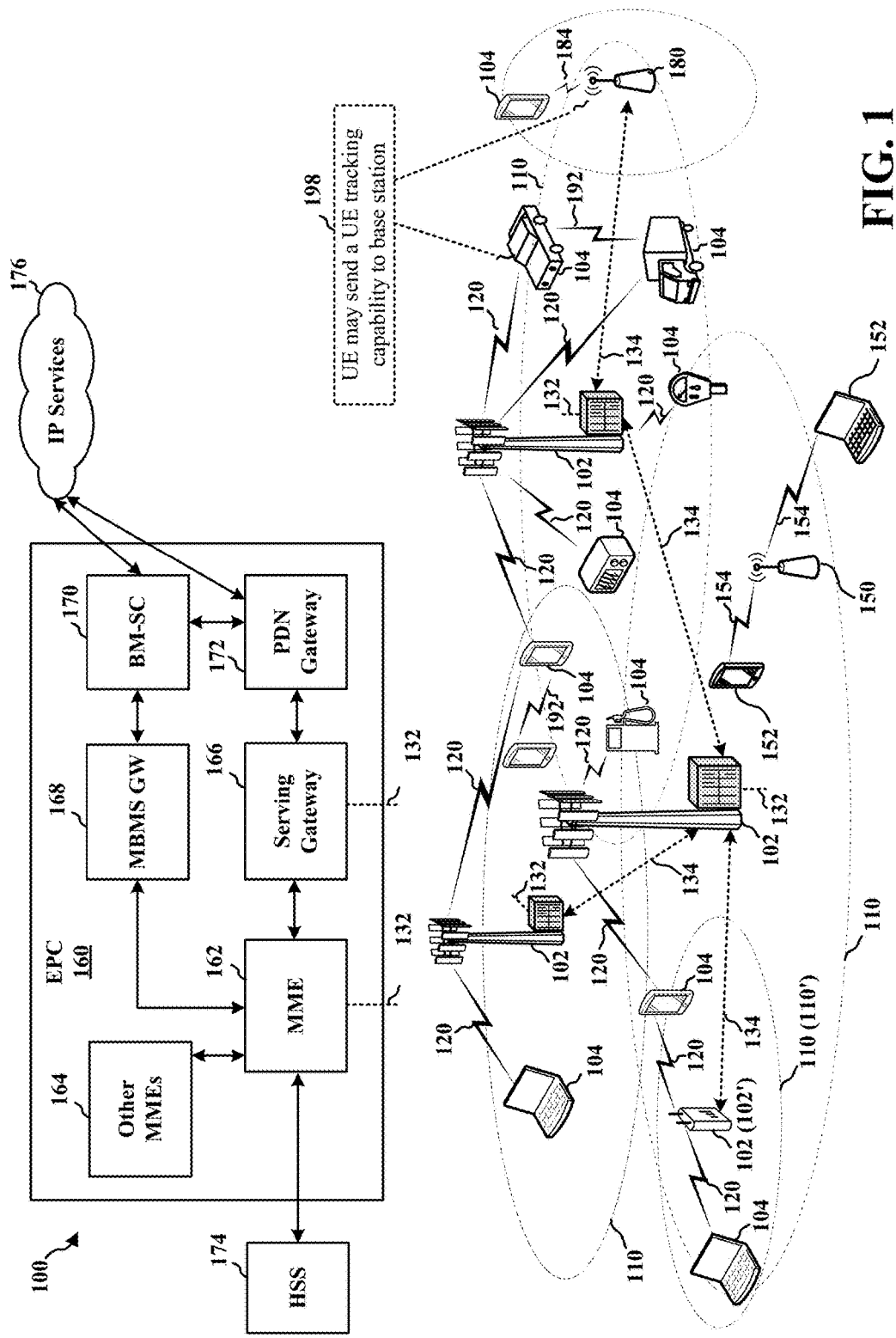
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. In some configurations, when the UEs 104 communicating with each other using the communication link 192 are vehicles (or where UEs 104 are implemented as part of vehicles), the communication link 192 may be a V2V communication link and the communicating UEs 104 (e.g., vehicles) may be said to be in V2V communication. Some of the UEs 104 communicate together in V2V communication using the DL/UL WWAN spectrum, some may communicate with the base station 102, and some may do both. Thus, the communication link 192 may use the DL/UL WWAN spectrum. Some UEs 104 (e.g., vehicles) may also communicate with other devices and/or the base station 108 which may be described as a vehicle-to-everything (V2X) type of communication. The D2D and/or V2V and/or V2X communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless communications systems, such as for example, wireless V2V and/or V2X communication systems based on FlashLinQ, WiMedia, Bluetooth, ZigBee, or Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine a UE capability of the UE associated with at least a number of different carrier synchronization timings that the UE can track within a plurality of carriers, e.g., sidelink carriers for V2X sidelink communications (198). The plurality of carriers may be associated with a plurality of different networks including a first network, e.g., with which UE 104 is associated. The UE 104 may be further configured to send the determined UE capability to a base station (198). The UE 104 may be further configured to receive a set of synchronization-timing priorities for prioritizing timing synchronization types within each carrier of a set of carriers of the plurality of carriers from the base station, and synchronize, for each carrier of the set of carriers, a timing based on the received set of synchronization-timing priorities (198).

Figure 2:
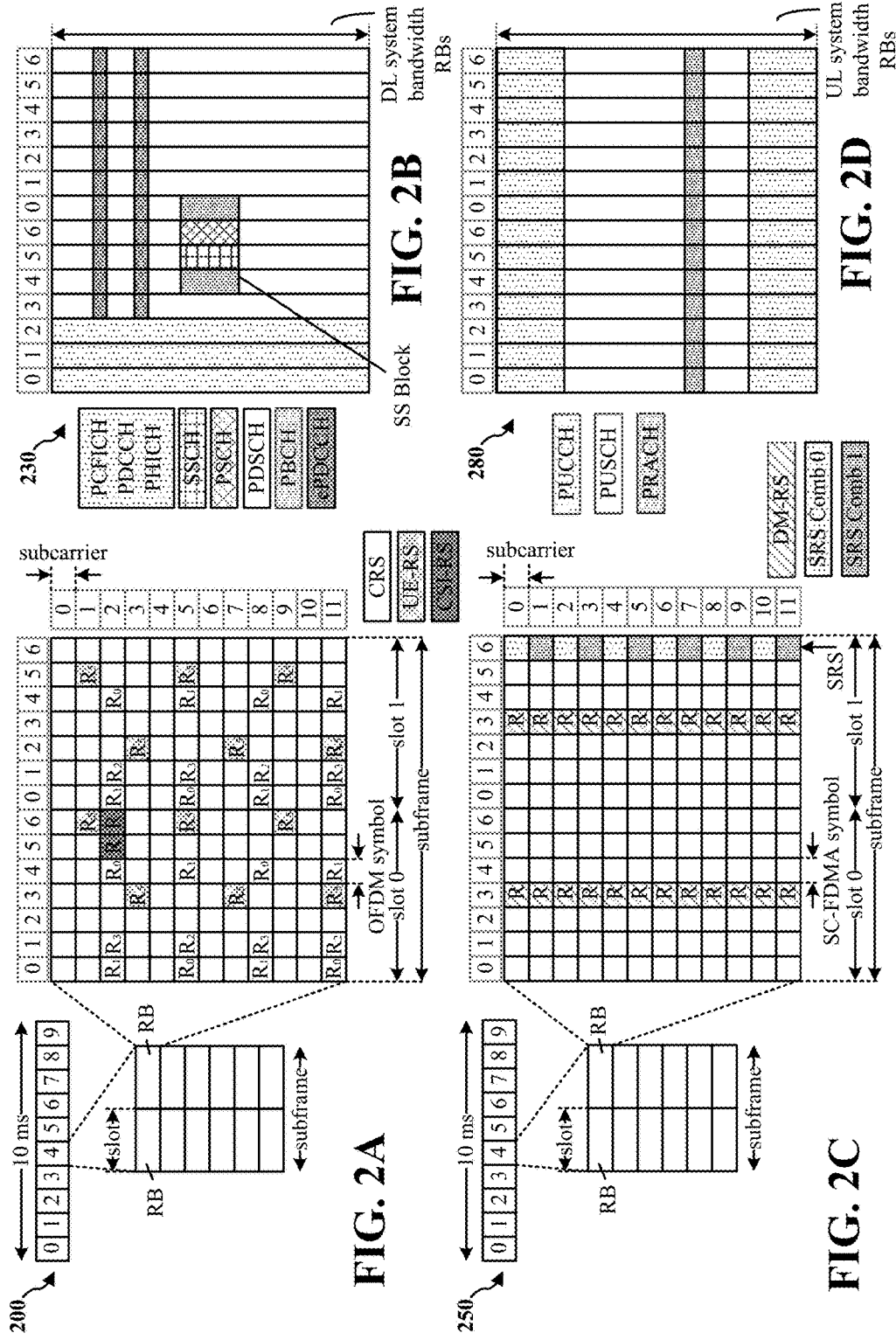
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
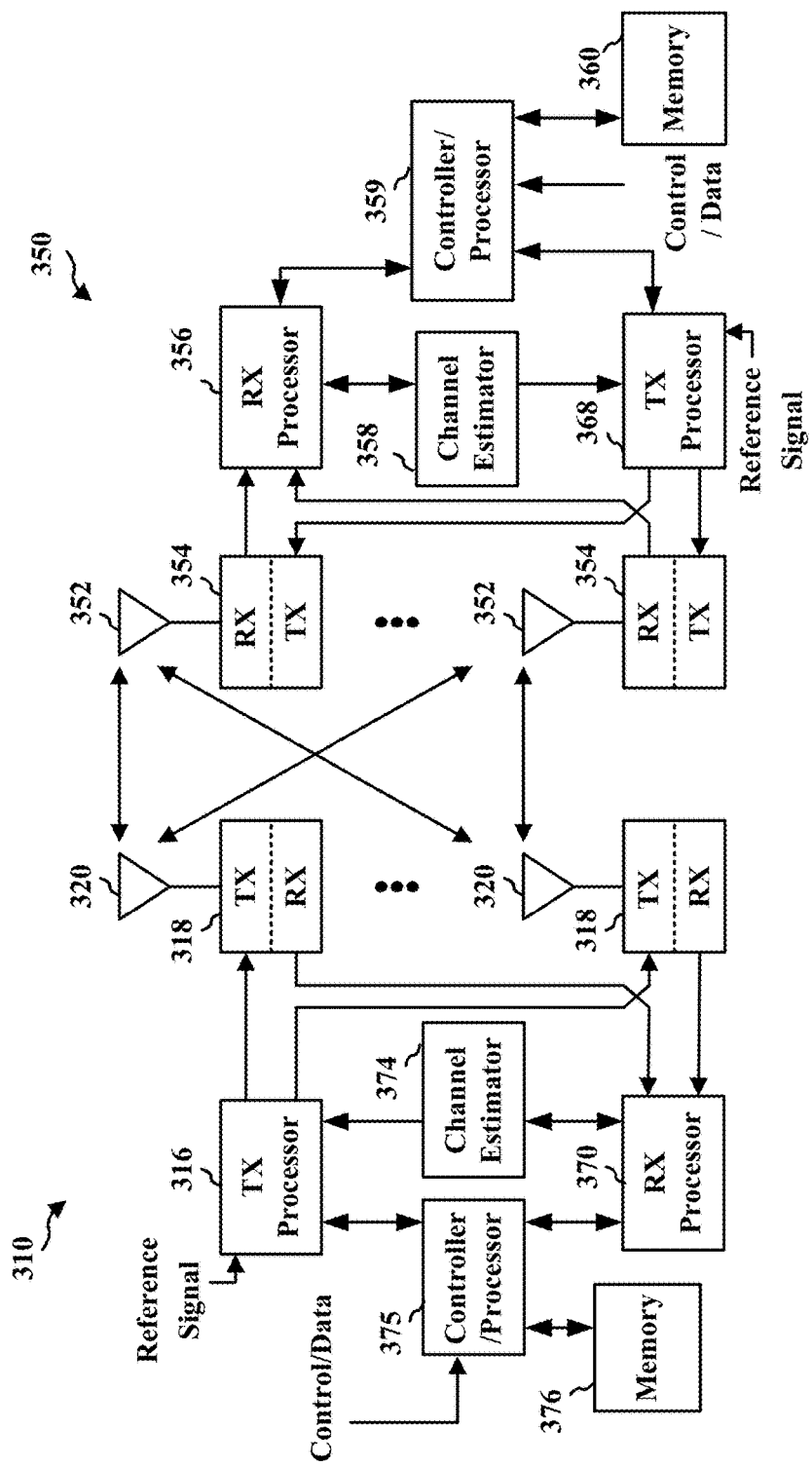
FIG. 3 is a diagram illustrating an example of an evolved Node B (eNB) and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

V2X communication may include communication of information from a vehicle to any entity that may affect the vehicle, and vice versa. V2X communication may be based on 5.9 GHz dedicated short range communication. For V2X operations in multiple carrier components, each carrier component may use different timing. For example, there may be multiple, e.g., 3, operators (e.g., corresponding to 3 networks) controlling 3 V2X carrier components, e.g., 3 communication frequencies and/or bands. Each operator may have its own timing, which is different from the timing adopted by another different network operator. Each operator may inform associated devices, e.g., V2X UEs associated with the network, to either follow the timing of the operator's network or global navigation satellite system (GNSS) timing. In such a scenario, a V2X UE that supports all 3 carrier components corresponding to the 3 different networks should be able to follow all three possible timings (of the corresponding networks). However, in such a case the V2X UE implementation may be quite challenging. Furthermore, the challenge of tracking multiple timings scales quickly with the number of carrier components. Thus, the larger the number of supported carrier components (each of which may correspond to a different timing adopted by the network to which the carrier component corresponds), the larger the number of timings the V2X UE may need to track, e.g., in order to be able to communicate with other devices on the multiple carrier components.

Thus from a deployment point of view, having the number of different reference timings (e.g., corresponding to one or more sidelink carriers used for V2X communication) that the UE is able to follow defined as a UE capability may be desirable and beneficial. In accordance with the features of some configurations, a lower end UE may be able to follow a lesser number of timings while a higher end, more expensive UE may be able to follow a greater number of timings, e.g., owing to the UE's higher capability in terms of tracking different synchronization timings.

In accordance with an aspect, in some configurations, the number of different carrier synchronization timings (e.g., multiple reference transmission (TX)/reception (RX) timings over various configured sidelink carriers for V2X sidelink communication) that a UE is able to follow is defined as a UE capability. The UE capability may be communicated by the corresponding UEs to a network when the UEs come into the network coverage and enter a RRC CONNECTED state for the first time. In accordance with an aspect of some configurations, the network may use the UE capability information to adjust a synchronization priority of each carrier component (CC) in such a way that the UEs may receive on as many CCs as possible. For example, if the network (e.g., the base station of the given network or another network node) observes that the majority of UEs may only follow two different synchronization timings, the network may set GNSS based timing (e.g., synchronization timing corresponding to a GNSS/satellite timing type source) as the highest priority on all CCs. Setting GNSS based timing as the highest priority on all CCs may allow the UEs to receive on all the CCs most of the time by just following two different timings: GNSS and the attached network timing, given that all CCs have GNSS as a type of synchronization source.

In some configurations, the maximum number of timings that the UE is able to follow for transmission (TX) may be different from the number of timings that the UE is able to follow for reception (RX). For this reason, the signaling may be separated for transmission and reception. In accordance with one feature of some configurations, when a UE is not in coverage and has not received any instruction from the network, the UE may follow a preconfigured synchronization procedure. For example, the UE may follow synchronization timings based on preconfigured information.

In some scenarios, the actual number of different synchronization timings in all the CCs may exceed the UE capability. Such scenarios may arise when the primary synchronization source is lost and the UE has to fall back to a lower priority synchronization source. In such case, the UE may be configured with a list of prioritized CCs to receive on. Then the UE may receive on the CCs in priority order in a best effort manner up to the limit of the UE's capability to track different CC timings. For example, if there are 3 CCs (e.g., C1, C2, and C3) with the following priority C1>C2>C3, and the reference synchronization timing of each CC is different, assuming that a UE is only capable of following 2 different timings, the UE may receive on C1 and C2 by tracking the corresponding synchronization timings of C1 and C2.

Figure 4:
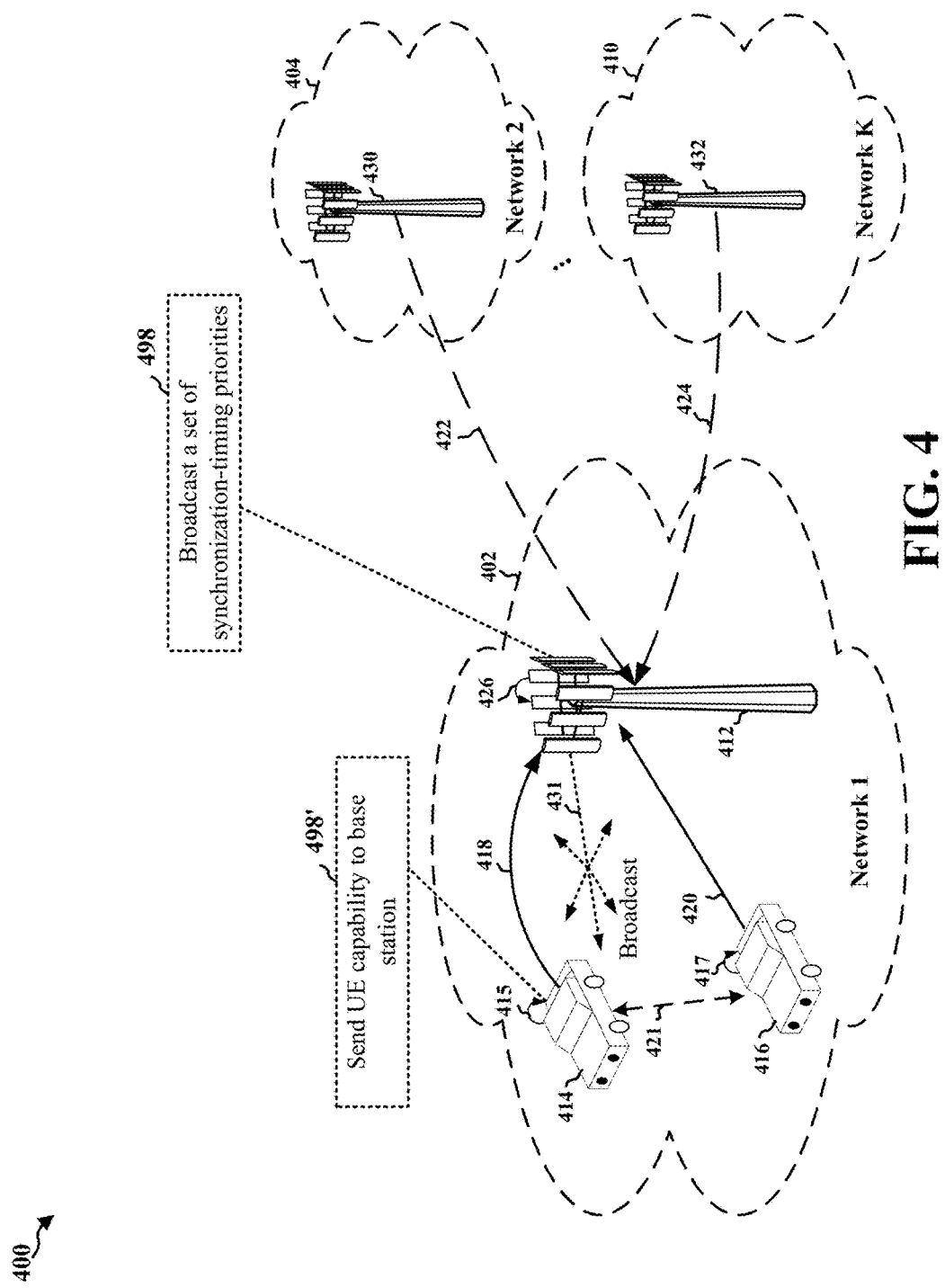
FIG. 4 illustrates an exemplary communication system including multiple networks, some of which may support communication using one or more sidelink carrier components.

FIG. 4 illustrates an exemplary communication system 400 and signaling between devices in accordance with an exemplary embodiment. The exemplary communication system 400 may support D2D communications between devices as well as WWAN assisted communications. Additionally, the communication system 400 may also support V2V and V2X sidelink communications as well which may be considered a type of D2D communication using sidelink carriers. Thus in at least some configurations, the UEs in the system 400 communicate using V2V and V2X type communications. As illustrated, the system 400 may include UEs which may be vehicles and/or user equipment devices installed in the vehicles. The communication system 400 may be a part of the system and access network of FIG. 1 and may include many elements which may be the same or similar to the elements discussed above with regard to FIG. 1. Various aspects related to the exemplary methods which may be used in the communication system 400 are discussed below.

In some configurations, the system 400 includes a plurality of networks including the first network 402, the second network 404, . . . , and Kth network 410. The first network 402 includes a base station 412 and a plurality of devices including UEs 414 and 416. The UEs 414 and 416 may support V2V and V2X modes and thus perform V2X type communications (421). The networks 404, 410 include base station 430 and base station 432 respectively and each may include devices (not shown) similar to UEs 414, 416 which may communicate in a similar manner using V2V and/or V2X type communications. In some configurations, the devices operating within at least some of the networks 402, 404, 420, may support communication using multiple carrier components. In various configurations, the multiple carrier components may correspond to configured sidelink carriers for V2X communication. For discussion purposes consider that each of the networks controls a different carrier component. For example, consider that the first network 402 controls a first carrier component C1, the second network 404 controls a second carrier component C2 and the Kth network 410 controls a Kth carrier component Ck. Furthermore, the synchronization timing in each of the networks 402, 404, 410 may be different in at least some configurations. However, in some configurations, devices operating in the networks 402, 404, 410 may be able to communicate, e.g., perform V2X communication, on all three CCs. While the networks 402, 404, 410 may each control different CCs and are shown in FIG. 4 as separate networks for clarity and ease in illustration, the networks may not be physically separate and may exist in the same physical/geographical area. Thus the base stations 412, 430, 432 need not necessarily be geographically distant from each other but may rather simply correspond to different operators/service providers within the same physical/geographical area.

In some configurations, a timing synchronization signal may be transmitted by one or more synchronization sources in each of the networks. The timing synchronization sources that may transmit timing synchronization signals may include the GNSS, a serving base station of the given network, a UE transmitting timing synchronization signals, etc. In some configurations, there may be multiple timing synchronization sources for each carrier component. Thus, in some configurations there may exist more than one time synchronization source in each network in each corresponding carrier. For example, in the first network 402 there may be two synchronization sources corresponding to carrier component C1. For example, the GNSS may be a first timing synchronization source while the serving base station 412 may be a second timing synchronization source. In the second network 404, the GNSS may be the sole timing synchronization source for C2. In the Kth network 410, the GNSS may be a first timing synchronization source corresponding to Ck, while the serving base station 432 may be a second timing synchronization source for Ck.

In accordance with an aspect, a number of different timings (e.g., carrier synchronization timings) that a UE is able to follow may be defined as a UE capability. For example, the UE capability may be defined as a parameter indicating a number of multiple reference TX/RX timings counted over all configured sidelink carriers for V2X sidelink communication). In accordance with one aspect, the UE capability may be expressed as an integer between 1 to X, where X may be <16. In various configurations, the UEs 414, 416 may communicate their respective UE capabilities to the network (e.g., to base station 412) when the UEs come into coverage and enter a RRC CONNECTED state for the first time. The UE capability may be included as an information element (IE) within the UE-Evolved Universal Terrestrial Radio Access (UE-EUTRA) capability. The reporting of the capability by each of the UEs in the network 402 may allow the base station 412 to determine how many timings each of the devices can track. A similar mechanism may be followed in each of the other networks 404, 410 where each of the UEs operating in the networks 404, 410 send the respective UE's capability information with respect to the number of synchronization timings each of the UEs can track.

Referring again to FIG. 4, in accordance with an aspect, the UEs 414 and 416 of the first network 402, each determines (shown using curved arrows 415, 417) a UE capability associated with at least a number of different carrier synchronization timings (e.g., reference synchronization timings of different supported carriers as discussed above) that the particular UE can track. The UE 414 may send (arrow 418) the determined UE capability of UE 414 to the base station 412 and the UE 416 may send (arrow 420) the determined UE capability of UE 416 to the base station 412. The sending of the UE capability may occur, for example, when each of the UEs 414, 416 enters an RRC CONNECTED state. While not shown in FIG. 4, the UEs in the networks 404, 410 may also determine and send their respective UE capabilities to the respective serving base stations 430, 432. In some, but not necessarily all configurations, the base stations of the various networks 402, 404, 410 may also share UE capabilities of each base station's respective associated UEs, with each other, e.g., via a core network node and/or over the internet. For example, in some configurations the base stations 430 and 432 may communicate (arrows 422 and 424) the UE capabilities of their respective associated UEs to the base station 412 of network 402.

Upon receiving the UE capability information from each of the plurality of UEs in the network 401, the base station 412 may determine (curved arrow 426) a set of synchronization-timing priorities based on the received UE capability information, for the plurality of UEs, e.g., including UEs 414, 416. The set of synchronization-timing priorities may indicate a priority for timing synchronization for use within each carrier of the plurality of carriers (e.g., carrier components C1, C2, . . . , Ck in the example) based on the received UE capability information. For example, consider that based on the reported UE capability information, the network 402 determines that most UEs in the network 402 can track 2 different carrier synchronization timings (e.g., UE capability parameter may be equal to 2 indicating 2 reference TX/RX timings that the UE can track) and each network uses three different types of timings A, B, C (e.g., corresponding to 3 different types of synchronization sources). The three types of timings may correspond to different types of synchronization sources including, e.g., direct GNSS, direct network timing source, a UE synced to network, a UE synced to GNSS, and an internal clock. Within each type of source, a UE may see many synchronization sources. That is, there may be a plurality of sources of the same type. In this example, the first network may determine a priority of [A, B, C] for a first carrier (e.g., carrier C1 of the first network 402); a priority of [B, C, A] for a second carrier (e.g., C2 of second network 404); and a priority of [A, B, C] for a third carrier (e.g., Ck of Kth network 410). In such a case the set of priorities may be {[A, B, C]; [B, C, A]; and [A, B, C]}. The first network 402 may determine the individual priorities for each carrier based on the network's understanding of the availability and/or reliability/strength of the types of timing synchronization sources for each carrier. The UEs receiving the set of priorities may know the mapping of each individual priority within the set to the corresponding carrier component. While the determining (426) is discussed in the example as being performed by the base station 412, the determining may be performed by another element of the network 402 other than the base station 412, e.g., by a network node such as an MME or another network node. In some configurations, the determining (426) may be further based on the UE capability information or carrier timing-synchronization priority associated with a second plurality of UEs from a second network different than the first network 402, e.g., such as network 404 and/or 410. In accordance with one aspect, the first network 402 may be further configured to determine for the plurality of UEs, a carrier priority based on the received UE capability information of UEs associated with the first network and optionally of UEs of one or more other networks. The carrier priority may indicate how to prioritize different carriers of the plurality of carriers for data transmission/reception purposes, and may be used in a case where the total number of different timings derived from the best available synchronization sources of the synchronization type with the highest priority in each carrier exceed the maximum number of different TX/RX timings that the UE can track.

In accordance with an aspect, the base station 412 may broadcast (illustrated by arrow 431) the determined set of synchronization-timing priorities to the UEs in the network 402. In some configurations, the determined set of synchronization-timing priorities may be broadcast in a system information block (SIB). The priority of different synchronization timings in the determined set may indicate what order of synchronization timing should be followed by the UEs for synchronization within each carrier. For example, if there are multiple synchronization sources for each of the MCCs supported by the devices in the network 402, the UEs may use the received set of synchronization-timing priorities to determine the reliability/strength of different types of synchronization sources based on the received priority information, and accordingly select the synchronization timing corresponding to the strongest source with the highest indicated priority (given that the corresponding timing synchronization source is available) as the reference timing for use in performing timing synchronization, e.g., for TX/RX operations. Thus, the UEs may perform timing synchronization, for at least one carrier, based on the received set of synchronization-timing priorities. In some configurations the UE may synchronize, for each carrier of the set of carriers, the timing to the best available synchronization source of the synchronization type with the highest priority based on the set of synchronization-timing priorities. In some configurations, this timing to which the UE synchronizes is used for both transmission and reception operations. Consider an example with the above discussed set of priorities where the set includes {[A, B, C]; [B, C, A]; and [A, B, C]} and where the UEs (e.g., UEs 414 and 416) can track 2 two synchronization timings. When operating on carrier C1 the UEs in the network 402 may use priority [A, B, C] of the set corresponding to C1 and treat the synchronization timing of type A with the highest priority, then synchronization timing of type B as having the second highest priority, as indicated by the first priority list (e.g., [A, B, C]) in the set which corresponds to carrier component C1. When operating on carrier C2, the UEs in the network 402 may treat the synchronization timing of type B with the highest priority, then synchronization timing of type C as the second highest priority, as indicated by the second priority list (e.g., [B, C, A]) in the set which corresponds to carrier component C2. When operating on carrier C3, the UEs in the network 402 may treat the synchronization timing of type A with the highest priority, then synchronization timing of type B as the second highest priority, as indicated by the third priority list (e.g., [A, B, C]) in the set corresponding to carrier component C3. In one configuration, type A timing may be a GNSS type synchronization timing, e.g., timing from a direct GNSS type source, type B timing may be a network type timing, e.g., timing from the attached network such as from serving base station, and type C timing may be from a UE synched to the attached network. The same concept may be extended to other networks. That is, the other networks 404, . . . , 410 and the UEs within each of these networks may follow the same mechanism as discussed above with regard to network 402. In some configurations, when a UE is not in network coverage and has not received any instruction from the network regarding timing synchronization priority, the UE may follow a preconfigured synchronization procedure. The UE may select the synchronization timing priority on its own and track the timings based on the tracking capability of the UE.

In some configurations, the base station 412 may broadcast a second type of priority, that is, the carrier priority to the plurality of UEs, e.g., in the same or a different broadcast than the broadcast of the set of synchronization-timing priorities. The carrier priority may be used, e.g., when the choice of synchronization sources in each carrier following the first priority results in the number of different timings in all carriers exceeding a UE's capability. In some configurations, the carrier priority may be used for a case where the total of different timings derived from the best available synchronization sources of the synchronization type with the highest priority in each carrier exceed the maximum number of different TX/RX timings that the UE can track. In an example, when the primary synchronization source is lost and a UE (e.g., UE 414) has to fall back to a less prioritized synchronization source, the UE may be configured with a list of priority per CCs to receive on. In such a case, the UE may receive in a best effort manner up to the limit of the UE's capability. For example, considering that there are 3 CCs with the carrier priority being C1>C2>C3, and the reference synchronization timing in each CC is different. If the UE is only capable of following 2 different timings (e.g., UE capability equals 2), then the UE may receive on C1 and C2. In cases where the actual number of different timings in all the CCs (e.g., indicated the set of synchronization-timing priorities) exceed that of UE capability, and the highest priority timing source for a given carrier being used is lost, then rather than falling back on a low priority synchronization timing for the given carrier, a UE may use the carrier priority to switch to another carrier if such a switch allows the UE to use a highest priority timing source, given the limited tracking capability of the device. For instance, if a UE on CC C1, can track only 2 timings, and the highest priority timing synchronization source is lost (which causes the UE to lose the corresponding highest priority timing being tracked) then based on the carrier priority (e.g., C1>C2>C3) the UE may switch to C2 and use the highest priority synchronization timing for C2.

Thus as discussed above, in various configurations, the network 402 may use the reported UE capability information to adjust the synchronization priority in each CC in such a way that the UEs 414, 416 can communicate (e.g., receive/transmit) on as many CCs as possible. For example, if based on the received UE capability information, the network 402 determines that the majority of UEs can only follow two different timings, with one timing corresponding to the GNSS for example, the network 402 in such a case may set GNSS based timing as the highest priority on all CCs. This allows all UEs to be able to communicate, e.g., receive, on all CCs most of the time by following two different timings, e.g., the GNSS timing and the attached network timing, e.g., transmitted by the base station 412.

Referring again to FIG. 4, in certain aspects the base station 412 may be configured (598) to receive UE capability information from each UE of a plurality of UEs, the UE capability information received from each UE indicating at least a number of different carrier synchronization timings that the UE can track within a plurality of carriers, determine for the plurality of UEs a set of synchronization-timing priorities based on the received UE capability information, the set of synchronization-timing priorities indicating a priority for timing synchronization types for use within each carrier of a set of carriers of the plurality of carriers, and broadcast the determined set of synchronization-timing priorities to the plurality of UEs. The UE 414 (and/or UE 416) may be configured (498') to determine a UE capability of the UE associated with at least a number of different carrier synchronization timings that the UE can track within a plurality of carriers, send the determined UE capability to a base station, receive, from the base station, a set of synchronization-timing priorities for prioritizing timing synchronization types within each carrier of a set of carriers of the plurality of carriers, and perform timing synchronization, for at least one carrier of the set of carriers, based on the received set of synchronization-timing priorities.

Figure 5:
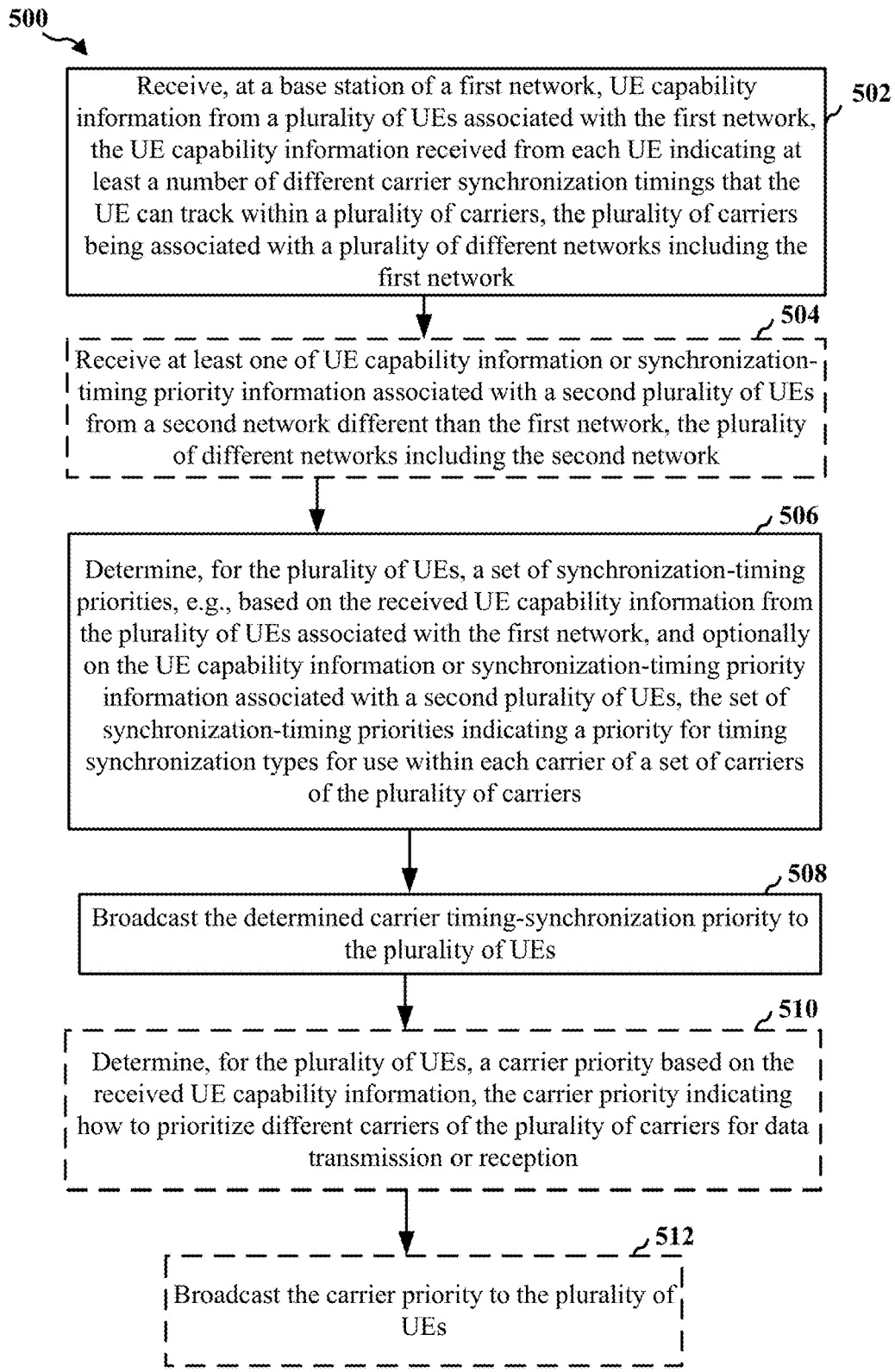
FIG. 5 is a flowchart of an exemplary method of wireless communication of a first network, in accordance with an exemplary configuration.

FIG. 5 is a flowchart 500 of an exemplary method of wireless communication of a first network in accordance with an aspect. The first network may be the network 402 of FIG. 4. Some of the operations may be optional as represented by dashed/broken lines. Some of the operations of the method may be performed by a base station, e.g., base station 412 of the first network 402. At 502, the base station of the first network receives UE capability information from each UE of a plurality of UEs. The UE capability information received from each UE may indicate at least a number of different carrier synchronization timings that the UE may track within a plurality of carriers. The plurality of carriers may be associated with a plurality of different networks including the first network. For example with reference to FIG. 4, the base station 412 may receive (418, 420) UE capability information from each of the UEs 414, 416 of network 402. The plurality of carriers, e.g., C1, C2, . . . , Ck may be associated with the plurality of different networks 402, 404, . . . , 410 as discussed earlier. In one configuration, the first network, the base station, and the plurality of UEs support vehicle-to-everything sidelink communications, e.g., over configured sidelink carriers such as carrier components C1, C2, . . . , Ck.

In some configurations, at 504 the base station may receive at least one of UE capability information or synchronization-timing priority information associated with a second plurality of UEs from a second network different than the first network, where the plurality of different networks includes the second network. For example, again referring to FIG. 4, the base station 412 may receive (422) from the second network 404 at least one of UE capability information or synchronization-timing priority information associated with a second plurality of UEs, e.g., UEs of the network 404, and may receive (424) from the Kth network 410, at least one of UE capability information or synchronization-timing priority information associated with another plurality of UEs, e.g., UEs of the network 410.

At 506, the network may determine, for the plurality of UEs, a set of synchronization-timing priorities based on the received UE capability information, the set of synchronization-timing priorities indicating a priority for timing synchronization types for use within each carrier of a set of carriers of the plurality of carriers. As described supra, in accordance with an aspect, the network may use the UE capability information to determine a synchronization priority of each carrier component in a manner that may allow the UEs to receive on as many carrier components as possible. For instance, all CCs may have GNSS as a type of synchronization source. If the network observes that the majority of UEs may only follow two different synchronization timings (e.g., based on the received UE capability information), the network may set GNSS based timing as the highest priority on all CCs. Setting GNSS based timing as the highest priority on all CCs may allow the UEs to receive on all the CCs most of the time by just following two different timings: GNSS and the attached network timing, given that all CCs have GNSS as a type of synchronization source. As discussed earlier with regard to FIG. 4, in some configurations, the determination (426) may be performed by the serving base station 412 of the first network 402 or another network node. The determination (426) in some configurations may be based on the UE capability information from the UEs associated with the first network 402. In some other configurations, the determination (426) may be further based on at least one of UE capability information or synchronization-timing priority information associated with another plurality of UEs associated with one or more other networks, e.g., such as networks 404, 410. As discussed earlier in an example discussed above with regard to FIG. 4, the determined set of priorities may be {[A, B, C]; [B, C, A]; and [A, B, C]} where each network uses three different types of timing A, B, C. In some configurations, the UE capability information from each UE of the plurality of UEs indicates a first number of different transmission carrier synchronization timings that the UE can track within the plurality of carriers and a second number of different reception carrier synchronization timings that the UE can track within the plurality of carriers. For example, the synchronization timing used for transmission and reception may be the same or different depending on the access scheme and/or timing structure adopted in a given network. In an aspect, the maximum number of timings that a UE is able to follow for transmission may be different from the number of timing that the UE is able to follow for reception. Thus in some configurations, the information communicated to the base station 412 by each UE with regard to a number of timings that the UE is able to follow for transmission may be separate from the information indicating a number of timings that the UE is able to follow for reception, e.g., in separate messages and/or separate field of the same message. In some configurations, in each carrier one common timing is used for both transmission and reception.

At 508, the base station may broadcast the determined set of synchronization-timing priorities to the plurality of UEs. For example, with reference to FIG. 4, the base station 412 may broadcast (431) the determined set of priorities (e.g., set {[A, B, C]; [B, C, A]; and [A, B, C] }) to the UEs 414, 416. In some configurations, broadcasting the determined set of priorities includes broadcasting the first set of synchronization-timing priorities (priority for transmission timing synchronization types) and the second set of synchronization-timing priorities (priority for reception timing synchronization types) to the plurality of UEs. In some configurations, the determined set of synchronization-timing priorities may be broadcast in a SIB to the plurality of UEs.

At 510, the network may determine, for the plurality of UEs, a carrier priority based on the received UE capability information. The carrier priority may indicate how to prioritize different carriers of the plurality of carriers for data transmission and/or reception. As discussed with regard to FIG. 4, in some configurations the base station 412 (or a core network node) may determine the carrier priority to assist the UEs in cases where the number of different TX/RX timings in all the CCs exceed the tracking capability of one or more UEs. For example, in cases when the choice of synchronization sources in each carrier, e.g., as indicated in the determined set of synchronization-timing priorities, results in a number of different TX/RX timings in all carriers exceeding the UE capability, the carrier priority may be used by the UEs to prioritize between carriers. At 512, the base station (e.g., base station 412 of network 402) may broadcast the carrier priority to the plurality of UEs associated with the network 402. The carrier priority may be broadcast in the same broadcast (e.g., broadcast 431) or a different broadcast than the broadcast of the set of synchronization-timing priorities. In one example, the network may determine an arbitrary carrier priority for TX, e.g. C1>C2>C3 . . . and may have the same carrier priority for RX. By having the same TX and RX priority, the largest number of successful communication between different UEs can be ensured. In another example, it may be specified by a regulator that a certain important piece of information will be transmitted on a certain carrier (control carrier). In such a case, the control carrier may be configured to have the highest priority in the carrier priority list, e.g., at least for RX.

Figure 6:
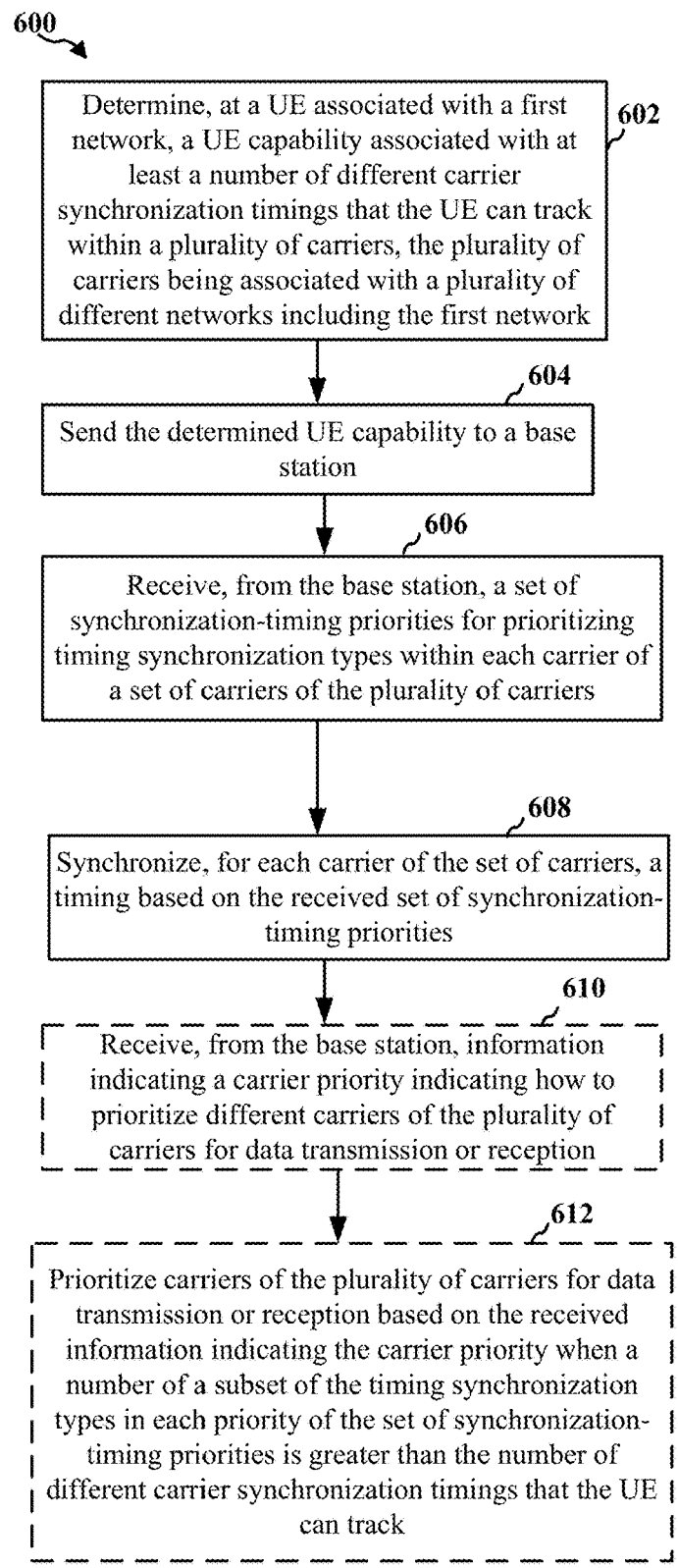
FIG. 6 is a flowchart of an exemplary method of wireless communication of a UE in accordance with an exemplary configuration.

FIG. 6 is a flowchart 600 of an exemplary method of wireless communication of a UE associated with a first network, in accordance with an aspect. The first network may be the network 402 of FIG. 4 and the UE implementing the method may be, e.g., UE 414 or UE 416. Some of the operations may be optional as represented by dashed/broken lines. At 602, the UE of the first network determines a UE capability (of the UE) associated with at least a number of different carrier synchronization timings that the UE can track within a plurality of carriers. The plurality of carriers may be associated with a plurality of different networks (e.g., corresponding to different operators) including the first network. For example, the plurality of carriers may be, e.g., C1, C2, . . . , Ck, which may be associated with the plurality of different networks 402, 404, . . . , 410. In accordance with an aspect, the number of different synchronization timings that the UE is able to follow may be defined as the UE capability as discussed in detail supra. For example with reference to FIG. 4, the UE 414 may determine the UE capability information with regard to a number of synchronization timings the UE 414 can track. Depending on the UE type (e.g., high end expensive device or low end limited capability device), different UEs may be have different capabilities. The UE 414 may be preconfigured with the UE capability for tracking timings, e.g., indicating the number of synchronization timings the UE can track. In one configuration, the first network and the UE support vehicle-to-everything sidelink communications, e.g., over configured sidelink carriers such as carrier components C1, C2, . . . , Ck.

In some configurations, the determined UE capability may include a first UE capability associated with a first number of different transmission carrier synchronization timings that the UE can track within the plurality of carriers, and a second UE capability associated with a second number of different reception carrier synchronization timings that the UE can track within the plurality of carriers. As previously discussed, the maximum number of synchronization timings that the UE may be able to follow for transmission may be (but need not necessarily be) different from the number of timing that the UE may be able to follow for reception. Accordingly, in some configurations, the UE may determine (as part of the operation at 602) both a number of different transmission carrier synchronization timings and a number of different reception carrier synchronization timings that the UE can follow.

At 604, the UE may send the determined UE capability to a base station. For example, referring to FIG. 4, the UE 414 may send (418) the determined UE capability to the base station 412. In some configurations, the UE capability may be sent by the UE 414 to the network 402 once the UE comes into the network coverage and becomes RRC CONNECTED for the first time. At 606, the UE may receive, from the base station, a set of synchronization-timing priorities for prioritizing timing synchronization types within each carrier of a set of carriers of the plurality of carriers. For example, referring again to FIG. 4, the base station 412 may determine the set of synchronization-timing priorities indicating a priority for timing synchronization types for use within each carrier of the plurality of carriers and broadcasts (431) the set of synchronization-timing priorities to the UEs 414, 416 in the network 402. In some configurations, the UE may receive the set of synchronization-timing priorities, e.g., in a SIB, from the base station. Given the UE capability, the UE may track a limited number of different synchronization timings. Thus, in accordance with the features discussed supra, the UE may use the indicated priority for prioritizing timing synchronization types within each carrier.

At 608, the UE may perform timing synchronization, for at least one carrier, based on the received set of synchronization-timing priorities. In some configurations, the UE may perform timing synchronization, for each carrier in the plurality of CCs that the UE may operate on (e.g., configured sidelink carriers used for communication by the UE), based on the received set of synchronization-timing priorities. In some configurations, the UE may synchronize, for each carrier of the set of carriers, the timing (e.g., for TX/RX purposes) to the best available synchronization source of the synchronization type with the highest priority based on the set of synchronization-timing priorities. In some configurations, this timing to which the UE synchronizes may be used for both transmission and reception operations. Thus, in some configurations, in each carrier, one common timing may be used for both transmission and reception operations.

At 610, the UE may receive, from the base station, information indicating a carrier priority indicating how to prioritize different carriers of the plurality of carriers for data transmission and/or reception. As previously discussed with regard to FIG. 4, the base station 412 may determine and broadcast a carrier priority indicating how to prioritize different carriers of the plurality of carriers for data transmission and/or reception, to the UEs in the network. The UE may use the carrier priority, for example, in cases where the actual number of different timings in all the CCs exceed the tracking capability of the UE as discussed above. For example, in cases when the choice of synchronization sources in each carrier, e.g., as indicated in the received set of synchronization-timing priorities, results in a number of different TX/RX timings in all carriers exceeding the UE capability, the carrier priority may be used by the UE to prioritize between carriers. Thus, in some configurations, at 612, the UE (e.g., UE 414 of network 402) may prioritize carriers of the plurality of carriers for data transmission and/or reception based on the received information indicating the carrier priority when a number of a subset of the timing synchronization types in each priority of the set of synchronization-timing priorities is greater than the number of different carrier synchronization (TX/RX) timings that the UE can track. In some configurations, the prioritizing of the carriers is performed for the case where the total of different timings derived from the best available synchronization sources of the synchronization type with the highest priority in each carrier exceed the maximum number of different TX/RX timings that the UE can track. For example, the use of carrier priority may apply when the number of timings of the actual synchronization sources identified by the set of timing priority (received from the base station) exceed the UE capability (not the number of synchronization source types). For example, there may be a synchronization source type such as: "other UE synchronized to network". But in each carrier, the actual UE referred to as the synchronization source may be different. In one aspect, prioritizing carriers of the plurality of carriers for data transmission and/or reception based on the received carrier priority information may include, e.g., using/preferring to use carrier components for V2X communications based on the received carrier priority. For example, a higher priority carrier component (e.g., C1) indicated to have a higher priority in the received carrier priority information may be preferred for V2X communications.

Figure 7:
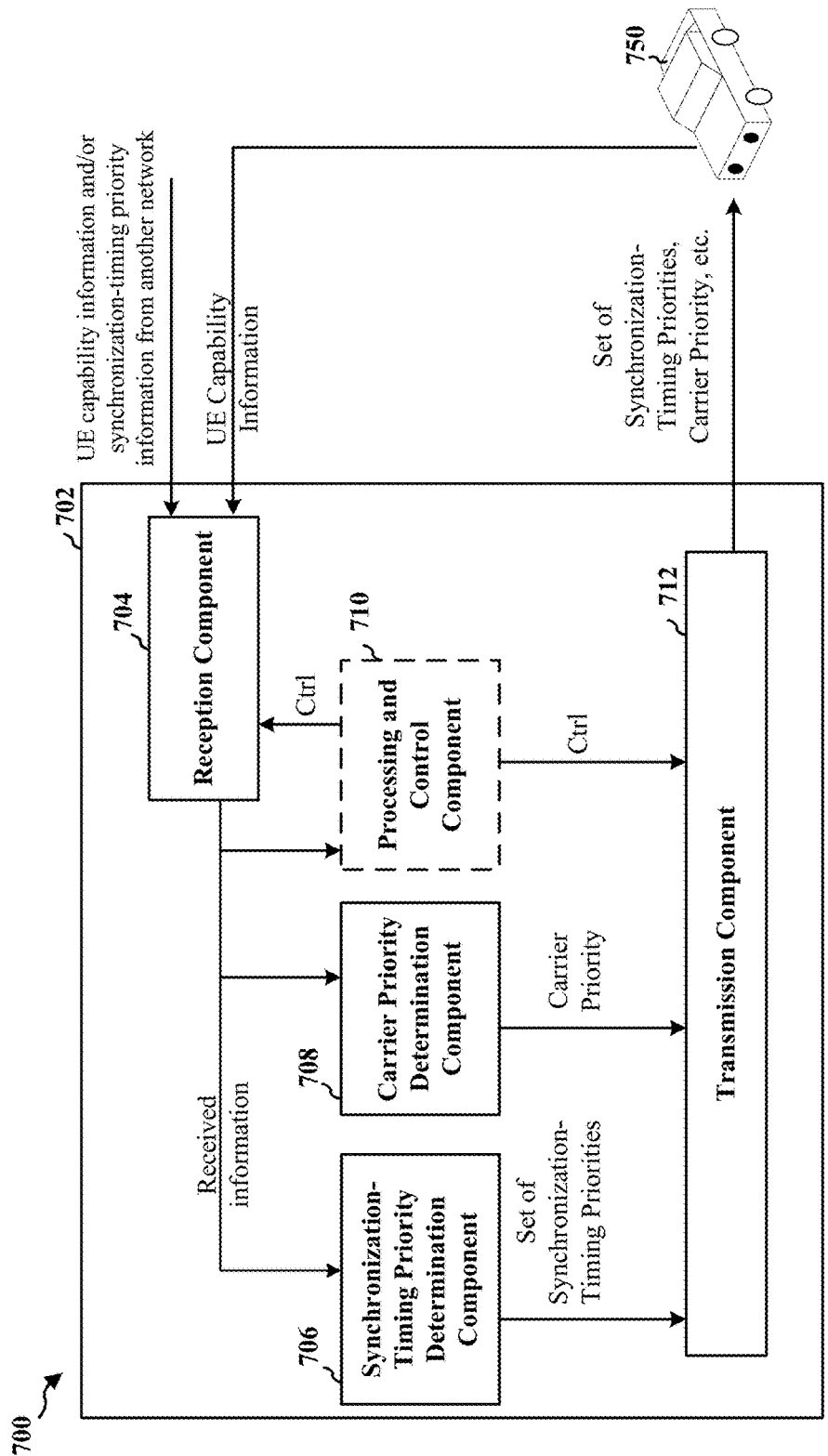
FIG. 7 is a conceptual data flow diagram illustrating the data flow between different means/components in an exemplary apparatus.

FIG. 7 is a conceptual data flow diagram 700 illustrating the data flow between different means/components in an example apparatus 702. The apparatus may be a base station (e.g., such as base station 180, 310, 412, 950). For the purpose of discussion, we may consider that the apparatus 702 may correspond to the base station 412 of the first network 402 shown in FIG. 4. The apparatus 702 may include a reception component 704, a synchronization-timing priority determination component 706, a carrier priority determination component 708, a processing and control component 710, and a transmission component 712.

The reception component 704 may be configured to receive messages and/or other information from other devices including, e.g., UE 750 associated with a first network, and base stations/nodes of one or more other networks. The signals/information received by the reception component 704 may be provided to the processing and control component 710 and/or other components of the apparatus 702 for further processing and use in performing various operations in accordance with the method of flowchart 500. In some configurations, the reception component 704 may be configured to receive UE capability information from each UE of a plurality of UEs (e.g., including UE 750), the UE capability information received from each UE indicating at least a number of different carrier synchronization timings that the UE can track within a plurality of carriers. The plurality of carriers may be associated with a plurality of different networks including the first network. For example with reference to FIG. 4, the apparatus 702 may be the base station 412 and the reception component 704 may receive UE capability information from each of the UEs of network 402, and the plurality of carriers, e.g., C1, C2, . . . , Ck, may be associated with the plurality of different networks 402, 404, . . . , 410 as discussed earlier. In some configurations, the reception component 704 may be further configured to receive at least one of UE capability information or synchronization-timing priority information associated with a second plurality of UEs from a second network different than the first network. For example, again referring to FIG. 4, the reception component 704 may receive, from the second network 404, at least one of UE capability information or synchronization-timing priority information associated with a second plurality of UEs, e.g., UEs of the network 404, and may receive from the Kth network 410, at least one of UE capability information or synchronization-timing priority information associated with another plurality of UEs, e.g., UEs of the network 410.

The synchronization-timing priority determination component 706 may be configured to determine, for the plurality of UEs, a set of synchronization-timing priorities based on the received UE capability information, where the set of synchronization-timing priorities may indicate a priority for timing synchronization types for use within each carrier of a set of carriers of the plurality of carriers. The determination in some configurations may be based on the UE capability information from the UEs associated with the first network, e.g., first network 402 of FIG. 4. For example, the synchronization-timing priority determination component 706 may receive the UE capability information (received from the UEs associated with the first network) an input from the reception component 704 and determine the set of synchronization-timing priorities based on the received UE capability information as discussed in detail above with respect to FIG. 4 and the flowchart 500 of FIG. 5. In some configurations, the determination may be further based on at least one of UE capability information or synchronization-timing priority information associated with another plurality of UEs associated with one or more other networks, e.g., such as networks 404, 410 of FIG. 4.

The carrier priority determination component 708 may be configured to determine, for the plurality of UEs, a carrier priority based on the received UE capability information. The carrier priority may indicate how to prioritize different carriers of the plurality of carriers for data transmission or reception. For example, as discussed in connection with FIG. 4, in addition to determining the set of synchronization-timing priorities the base station 412 may determine the carrier priority to assist the UEs in cases where the number of TX/RX timings in all the CCs exceed the tracking capability of one or more UEs. In such cases, when the choice of synchronization sources in each carrier, e.g., as indicated in the determined set of synchronization-timing priorities, results in a number of different timings in all carriers exceeding the UE capability, the determined carrier priority which may be sent to the UEs may allow the UEs to prioritize between carriers.

The transmission component 712 may be configured to transmit messages to one or more external devices, e.g., to a plurality of UEs including UE 750 and/or other UEs. In some configurations, the transmission component 712 alone, in combination with and/or under the control of the control component 710, may be configured to transmit, e.g., broadcast, the determined set of synchronization-timing priorities to the plurality of UEs. For example, with reference to the example discussed with respect to FIG. 4, the transmission component 712 may broadcast the determined set of priorities (e.g., set {[A, B, C]; [B, C, A]; and [A, B, C]}) to the UEs. In some configurations, broadcasting the determined set of priorities may include broadcasting a first set of synchronization-timing priorities (priority for transmission timing synchronization types) and a second set of synchronization-timing priorities (priority for reception timing synchronization types) to the plurality of UEs. In some configurations, the determined set of synchronization-timing priorities may be broadcasted in a SIB to the plurality of UEs.

In some configurations, the transmission component 712 alone, in combination with and/or under the control of the control component 710, may be further configured to transmit (e.g., broadcast) the carrier priority to the plurality of UEs. The carrier priority may be broadcast in the same broadcast or a different broadcast than the broadcast of the set of synchronization-timing priorities. The control component 710 may be configured to control the transmission/reception schedule and/or transmission/reception timing of one or more signals transmitted/received by the transmission component 712. In some configurations, the control component 1210 may be implemented within the transmission and reception components 712, 704.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
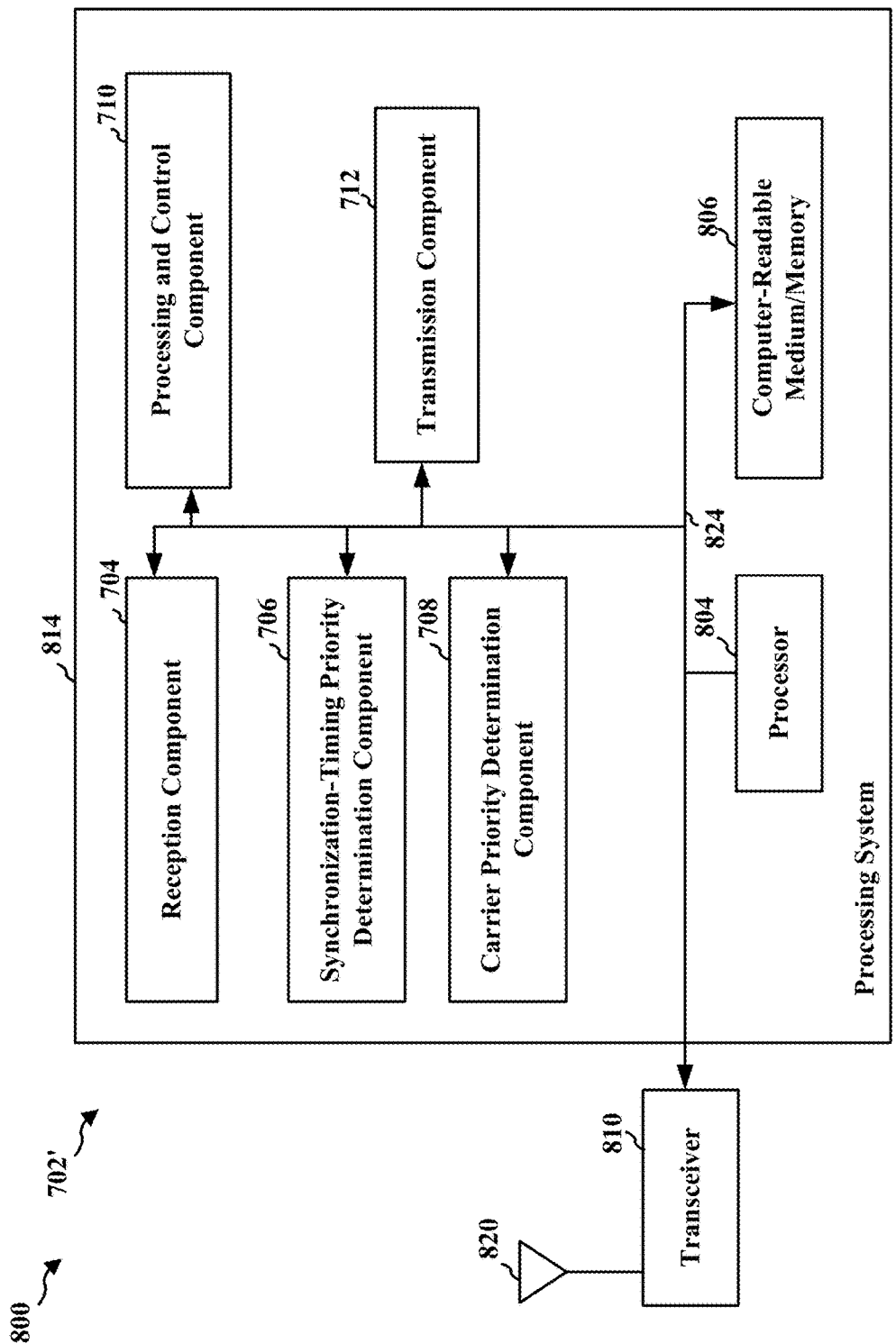
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375.

In one configuration, the apparatus 702/702' for wireless communication includes means for receiving UE capability information from each UE of a plurality of UEs, the UE capability information received from each UE indicating at least a number of different carrier synchronization timings that the UE can track within a plurality of carriers. The plurality of carriers may be associated with a plurality of different networks including the first network. In some configurations, the apparatus further comprises means for determining, for the plurality of UEs, a set of synchronization-timing priorities based on the received UE capability information, the set of synchronization-timing priorities indicating a priority for timing synchronization types for use within each carrier of a set of carriers of the plurality of carriers. In some configurations, the apparatus 702/702' further comprises means for broadcasting the determined set of synchronization-timing priorities to the plurality of UEs. In some configurations, the plurality of UEs is associated with the first network. In some configurations, the means for receiving is further configured to receive at least one of UE capability information or synchronization-timing priority information associated with a second plurality of UEs from a second network different than the first network, the plurality of different networks including the second network. In some configurations, the means for determining is configured to determine the set of synchronization-timing priorities for the plurality of UEs further based on the at least one of the UE capability information or the synchronization-timing priority information associated with the second plurality of UEs from the second network.

In some configurations, the UE capability information from each UE of the plurality of UEs may indicate a first number of different transmission carrier synchronization timings that the UE can track within the plurality of carriers and a second number of different reception carrier synchronization timings that the UE can track within the plurality of carriers. In some configurations, the apparatus 702/702' further comprises means for determining, for the plurality of UEs, a carrier priority based on the received UE capability information, the carrier priority indicating how to prioritize different carriers of the plurality of carriers for data transmission or reception. In some configurations, the means for broadcasting is further configured to broadcast the carrier priority to the plurality of UEs.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
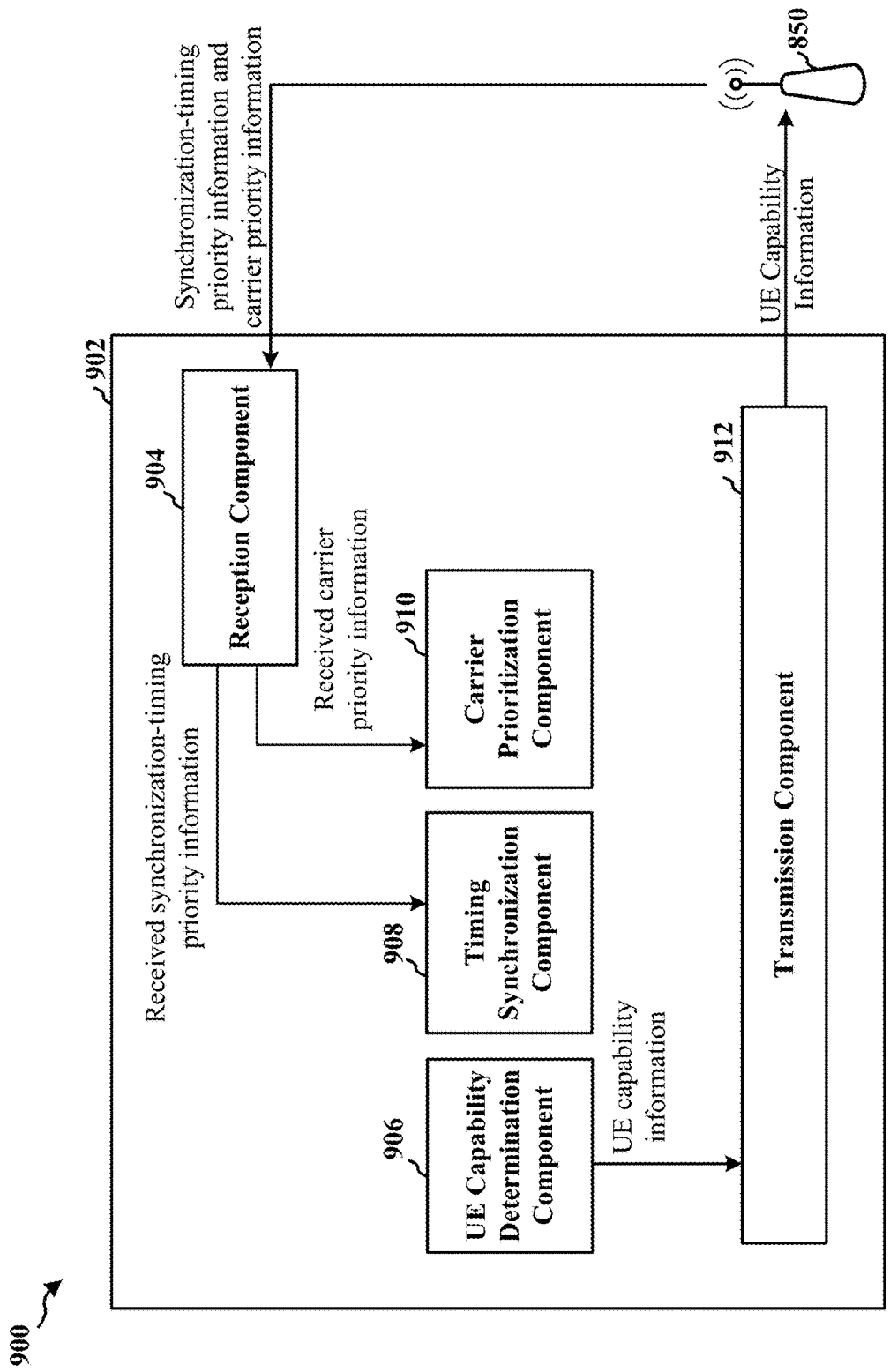
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., such as UE 104, 350, 414, 416, 750) capable of V2X sidelink communications (e.g., V2X communications over sidelink carriers). The apparatus 902 may be associated with a first network, e.g., such as the network 402 of FIG. 4. The apparatus 902 may include a reception component 904, a UE capability determination component 906, a timing synchronization component 908, a carrier prioritization component 910, and a transmission component 912.

The reception component 904 may be configured to receive control/data signals and/or other information from other devices including the base station 950 and other UEs. The reception component 904 and the transmission component 912 may cooperate to coordinate the communication operations of the apparatus 902.

The UE capability determination component 906 may be configured to determine a UE capability (of the apparatus) associated with at least a number of different carrier synchronization timings that the apparatus 902 can track within a plurality of carriers. The plurality of carriers may be associated with a plurality of different networks (e.g., corresponding to different operators) including the first network. In some configurations, the determined UE capability may include a first UE capability associated with a first number of different transmission carrier synchronization timings that the apparatus 902 can track within the plurality of carriers, and a second UE capability associated with a second number of different reception carrier synchronization timings that the apparatus 902 can track within the plurality of carriers.

The transmission component 912 may be configured to send the determined UE capability to a base station (e.g., base station 950). For example, with reference to FIG. 4, the apparatus 902 may be the UE 414 and the transmission component 912 may send the determined UE capability to the base station 412. In some configurations, the apparatus 902 may be configured to control the transmission component 912 to send the determined UE capability to the network (e.g., the first network with which the apparatus 902 is associated) once the apparatus comes into the network coverage and becomes RRC CONNECTED for the first time.

In one configuration, the reception component 904 may be configured to receive, from the base station 950, a set of synchronization-timing priorities for prioritizing timing synchronization types within each carrier of a set of carriers of the plurality of carriers. For example, again with reference to FIG. 4, the apparatus 902 may be the UE 414 and the set of synchronization-timing priorities indicating a priority for timing synchronization types for use within each carrier of the plurality of carriers may be received from the base station 412. In some configurations, the set of synchronization-timing priorities may be received, e.g., in a SIB, from the base station. Given that the apparatus may track a limited number of different synchronization timings based on its capability (UE capability), the apparatus 902 may use the indicated priority for prioritizing timing synchronization types within each carrier as discussed in detail with respect to FIG. 4 and FIG. 6.

The timing synchronization component 908 may be configured to perform timing synchronization, for at least one carrier, based on the received set of synchronization-timing priorities. In some configurations, the timing synchronization component 908 may perform timing synchronization, for each carrier in the plurality of CCs that the apparatus 902 may use for communication (e.g., configured sidelink carriers used for communication by the apparatus), based on the received set of synchronization-timing priorities. In some configurations, the timing synchronization component 908 may synchronize, for each carrier of the set of carriers, the timing (e.g., for TX/RX purposes) to the best available synchronization source of the synchronization type with the highest priority based on the received set of synchronization-timing priorities. In some configurations, this timing to which the apparatus 902 synchronizes may be used for both transmission and reception operations. Thus, in some configurations, in each carrier, one common timing may be used for both transmission and reception operations.

In some configurations, the reception component 904 may be further configured to receive, from the base station 950, information indicating a carrier priority indicating how to prioritize different carriers of the plurality of carriers for data transmission or reception. In one configuration, the carrier prioritization component 910 may be configured to prioritize carriers of the plurality of carriers for data transmission or reception based on the received information indicating the carrier priority when a number of a subset of the timing synchronization types in each priority of the set of synchronization-timing priorities is greater than the number of different carrier synchronization timings (TX/RX timings) that the UE can track.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
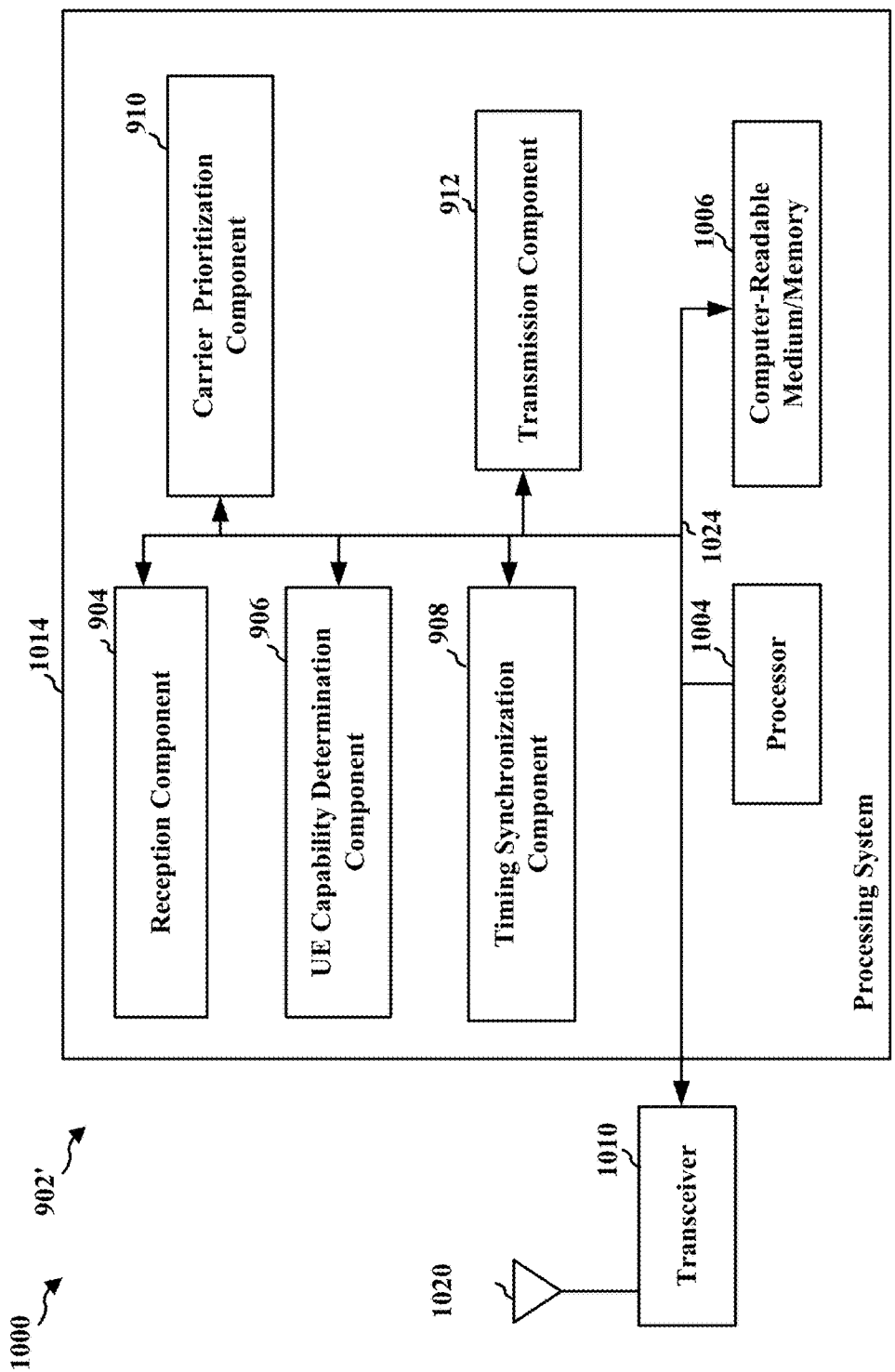
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, and 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication may be a UE comprising means for determining a UE capability of the UE associated with at least a number of different carrier synchronization timings that the UE can track within a plurality of carriers. The plurality of carriers may be associated with a plurality of different networks including the first network. The UE may further comprise means for sending the determined UE capability to a base station. In one configuration, the UE may further comprise means for receiving, from the base station, a set of synchronization-timing priorities for prioritizing timing synchronization types within each carrier of a set of carriers of the plurality of carriers. In one configuration, the UE may further comprise means for synchronizing, for each carrier of the set of carriers, a timing based on the received set of synchronization-timing priorities.

In some configurations, the means for receiving is further configured to receive, from the base station, information indicating a carrier priority indicating how to prioritize different carriers of the plurality of carriers for data transmission or reception. In some configurations, the UE may further comprise means for prioritizing carriers of the plurality of carriers for data transmission or reception based on the received information indicating the carrier priority In one configuration, the prioritizing may be performed by the means for prioritizing when a number of a subset of the timing synchronization types in each priority of the set of synchronization-timing priorities is greater than the number of different TX/RX timings that the UE can track.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first network, comprising:
   receiving, at a base station, user equipment (UE) capability information from each UE of a plurality of UEs, the UE capability information received from each UE indicating at least a number of different carrier synchronization timings that the UE can track within a plurality of carriers, the plurality of carriers being associated with a plurality of different networks including the first network;
   determining, for the plurality of UEs, a set of synchronization-timing priorities based on the received UE capability information, the set of synchronization-timing priorities indicating a priority for timing synchronization types for use within each carrier of a set of carriers of the plurality of carriers; and
   broadcasting, from the base station, the determined set of synchronization-timing priorities to the plurality of UEs.

2. The method of claim 1, wherein:
   the plurality of UEs is associated with the first network,
   the method further comprises receiving at least one of UE capability information or synchronization-timing priority information associated with a second plurality of UEs from a second network different than the first network, the plurality of different networks including the second network, and
   the set of synchronization-timing priorities for the plurality of UEs is further determined based on the at least one of the UE capability information or the synchronization-timing priority information associated with the second plurality of UEs from the second network.

3. The method of claim 1, wherein the UE capability information from each UE of the plurality of UEs indicates a first number of different transmission carrier synchronization timings that the UE can track within the plurality of carriers and a second number of different reception carrier synchronization timings that the UE can track within the plurality of carriers.

4. The method of claim 1, wherein the determined set of synchronization-timing priorities is broadcasted in a system information block (SIB) to the plurality of UEs.

5. The method of claim 1, further comprising:
   determining, for the plurality of UEs, a carrier priority based on the received UE capability information, the carrier priority indicating how to prioritize different carriers of the plurality of carriers for data transmission or reception; and
   broadcasting the carrier priority to the plurality of UEs.

6. The method of claim 1, wherein the first network, the base station, and the plurality of UEs support vehicle-to-everything sidelink communications.

7. A method of wireless communication of a user equipment (UE) associated with a first network, comprising:
   determining a UE capability of the UE associated with at least a number of different carrier synchronization timings that the UE can track within a plurality of carriers, the plurality of carriers being associated with a plurality of different networks including the first network;
   sending the determined UE capability to a base station;
   receiving, from the base station, a set of synchronization-timing priorities for prioritizing timing synchronization types within each carrier of a set of carriers of the plurality of carriers; and
   synchronizing, for each carrier of the set of carriers, a timing based on the received set of synchronization-timing priorities.

8. The method of claim 7, wherein the determined UE capability includes a first UE capability associated with a first number of different transmission carrier synchronization timings that the UE can track within the plurality of carriers, and includes a second UE capability associated with a second number of different reception carrier synchronization timings that the UE can track within the plurality of carriers.

9. The method of claim 7, further comprising:
   receiving, from the base station, information indicating a carrier priority indicating how to prioritize different carriers of the plurality of carriers for data transmission or reception; and
   prioritizing carriers of the plurality of carriers for data transmission or reception based on the received information indicating the carrier priority when a number of a subset of the timing synchronization types in each priority of the set of synchronization-timing priorities is greater than the number of different carrier synchronization timings that the UE can track.

10. The method of claim 7, wherein the UE and the first network support vehicle-to-everything sidelink communications.

11. An apparatus of wireless communication of a first network, comprising:
    means for receiving user equipment (UE) capability information from each UE of a plurality of UEs, the UE capability information received from each UE indicating at least a number of different carrier synchronization timings that the UE can track within a plurality of carriers, the plurality of carriers being associated with a plurality of different networks including the first network;

means for determining, for the plurality of UEs, a set of synchronization-timing priorities based on the received UE capability information, the set of synchronization-timing priorities indicating a priority for timing synchronization types for use within each carrier of a set of carriers of the plurality of carriers; and means for broadcasting the determined set of synchronization-timing priorities to the plurality of UEs.

12. The apparatus of claim 11, wherein:

the plurality of UEs is associated with the first network, the means for receiving is further configured to receive at least one of UE capability information or synchronization-timing priority information associated with a second plurality of UEs from a second network different than the first network, the plurality of different networks including the second network, and the means for determining is configured to determine the set of synchronization-timing priorities for the plurality of UEs further based on the at least one of the UE capability information or the synchronization-timing priority information associated with the second plurality of UEs from the second network.

13. The apparatus of claim 11, wherein the UE capability information from each UE of the plurality of UEs indicates a first number of different transmission carrier synchronization timings that the UE can track within the plurality of carriers and a second number of different reception carrier synchronization timings that the UE can track within the plurality of carriers.

14. The apparatus of claim 11, wherein the determined set of synchronization-timing priorities is broadcasted in a system information block (SIB) to the plurality of UEs.

15. The apparatus of claim 11, further comprising:

means for determining, for the plurality of UEs, a carrier priority based on the received UE capability information, the carrier priority indicating how to prioritize different carriers of the plurality of carriers for data transmission or reception; and wherein the means for broadcasting is further configured to broadcast the carrier priority to the plurality of UEs.

16. An apparatus of wireless communication of a first network, comprising:

a memory; and at least one processor coupled to the memory and configured to:

receive user equipment (UE) capability information from each UE of a plurality of UEs, the UE capability information received from each UE indicating at least a number of different carrier synchronization timings that the UE can track within a plurality of carriers, the plurality of carriers being associated with a plurality of different networks including the first network;

determine, for the plurality of UEs, a set of synchronization-timing priorities based on the received UE capability information, the set of synchronization-timing priorities indicating a priority for timing synchronization types for use within each carrier of a set of carriers of the plurality of carriers; and broadcast the determined set of synchronization-timing priorities to the plurality of UEs.

17. The apparatus of claim 16, wherein the plurality of UEs is associated with the first network;

wherein the at least one processor is further configured to:

receive at least one of UE capability information or synchronization-timing priority information associated with a second plurality of UEs from a second network different than the first network, the plurality of different networks including the second network; and determine the set of synchronization-timing priorities for the plurality of UEs further based on the at least one of the UE capability information or the synchronization-timing priority information associated with the second plurality of UEs from the second network.

18. The apparatus of claim 16, wherein the UE capability information from each UE of the plurality of UEs indicates a first number of different transmission carrier synchronization timings that the UE can track within the plurality of carriers and a second number of different reception carrier synchronization timings that the UE can track within the plurality of carriers.

19. The apparatus of claim 16, wherein the determined set of synchronization-timing priorities is broadcasted in a system information block (SIB) to the plurality of UEs.

20. The apparatus of claim 16, wherein the at least one processor is further configured to:

determine, for the plurality of UEs, a carrier priority based on the received UE capability information, the carrier priority indicating how to prioritize different carriers of the plurality of carriers for data transmission or reception; and broadcast the carrier priority to the plurality of UEs.

21. The apparatus of claim 16, wherein the apparatus and the first network support vehicle-to-everything sidelink communications.

22. A non-transitory computer-readable medium of an apparatus in a first network, the computer-readable medium storing computer executable code executed by a processor, said code is configured to:

receive user equipment (UE) capability information from each UE of a plurality of UEs, the UE capability information received from each UE indicating at least a number of different carrier synchronization timings that the UE can track within a plurality of carriers, the plurality of carriers being associated with a plurality of different networks including the first network;

determine, for the plurality of UEs, a set of synchronization-timing priorities based on the received UE capability information, the set of synchronization-timing priorities indicating a priority for timing synchronization types for use within each carrier of a set of carriers of the plurality of carriers; and broadcast the determined set of synchronization-timing priorities to the plurality of UEs.

23. A user equipment (UE) associated with a first network, comprising:

means for determining a UE capability of the UE associated with at least a number of different carrier synchronization timings that the UE can track within a plurality of carriers, the plurality of carriers being associated with a plurality of different networks including the first network;

means for sending the determined UE capability to a base station;

means for receiving, from the base station, a set of synchronization-timing priorities for prioritizing timing synchronization types within each carrier of a set of carriers of the plurality of carriers; and means for synchronizing, for each carrier of the set of carriers, a timing based on the received set of synchronization-timing priorities.

24. The UE of claim 23, wherein the determined UE capability includes a first UE capability associated with a first number of different transmission carrier synchronization timings that the UE can track within the plurality of carriers, and includes a second UE capability associated with a second number of different reception carrier synchronization timings that the UE can track within the plurality of carriers.

25. The UE of claim 23,
wherein the means for receiving is further configured to receive, from the base station, information indicating a carrier priority indicating how to prioritize different carriers of the plurality of carriers for data transmission or reception; and
wherein the UE further comprises means for prioritizing carriers of the plurality of carriers for data transmission or reception based on the received information indicating the carrier priority, the prioritizing being performed when a number of a subset of the timing synchronization types in each priority of the set of synchronization-timing priorities is greater than the number of different carrier synchronization timings that the UE can track.

26. A user equipment (UE) associated with a first network, comprising:
a memory; and
at least one processor coupled to the memory and configured to:
determine a UE capability of the UE associated with at least a number of different carrier synchronization timings that the UE can track within a plurality of carriers, the plurality of carriers being associated with a plurality of different networks including the first network;
send the determined UE capability to a base station;
receive, from the base station, a set of synchronization-timing priorities for prioritizing timing synchronization types within each carrier of a set of carriers of the plurality of carriers; and
synchronize, for each carrier of the set of carriers, a timing based on the received set of synchronization-timing priorities.

27. The UE of claim 26, wherein the determined UE capability includes a first UE capability associated with a first number of different transmission carrier synchronization timings that the UE can track within the plurality of carriers, and includes a second UE capability associated with a second number of different reception carrier synchronization timings that the UE can track within the plurality of carriers.

28. The UE of claim 26, wherein the at least one processor is further configured to:
receive, from the base station, information indicating a carrier priority indicating how to prioritize different carriers of the plurality of carriers for data transmission or reception; and
prioritize carriers of the plurality of carriers for data transmission or reception based on the received information indicating the carrier priority when a number of a subset of the timing synchronization types in each priority of the set of synchronization-timing priorities is greater than the number of different carrier synchronization timings that the UE can track.

29. The UE of claim 26, wherein the UE and the first network support vehicle-to-everything sidelink communications.

30. A non-transitory computer-readable medium of a user equipment associated with a first network, the computer-readable medium storing computer executable code executed by a processor, said code is configured to:
determine a UE capability of the UE associated with at least a number of different carrier synchronization timings that the UE can track within a plurality of carriers, the plurality of carriers being associated with a plurality of different networks including the first network;
send the determined UE capability to a base station;
receive, from the base station, a set of synchronization-timing priorities for prioritizing timing synchronization types within each carrier of a set of carriers of the plurality of carriers; and
synchronize, for each carrier of the set of carriers, a timing based on the received set of synchronization-timing priorities.

* * * * *